March 28, 1961 F. J. KURTH ET AL 2,976,884
VALVE STRUCTURES
Filed May 19, 1958 3 Sheets-Sheet 1

INVENTORS
Franz J. Kurth,
Leonard R. Phillips,
BY Carroll Bailey
ATTORNEY

March 28, 1961  F. J. KURTH ET AL  2,976,884
VALVE STRUCTURES
Filed May 19, 1958  3 Sheets-Sheet 2
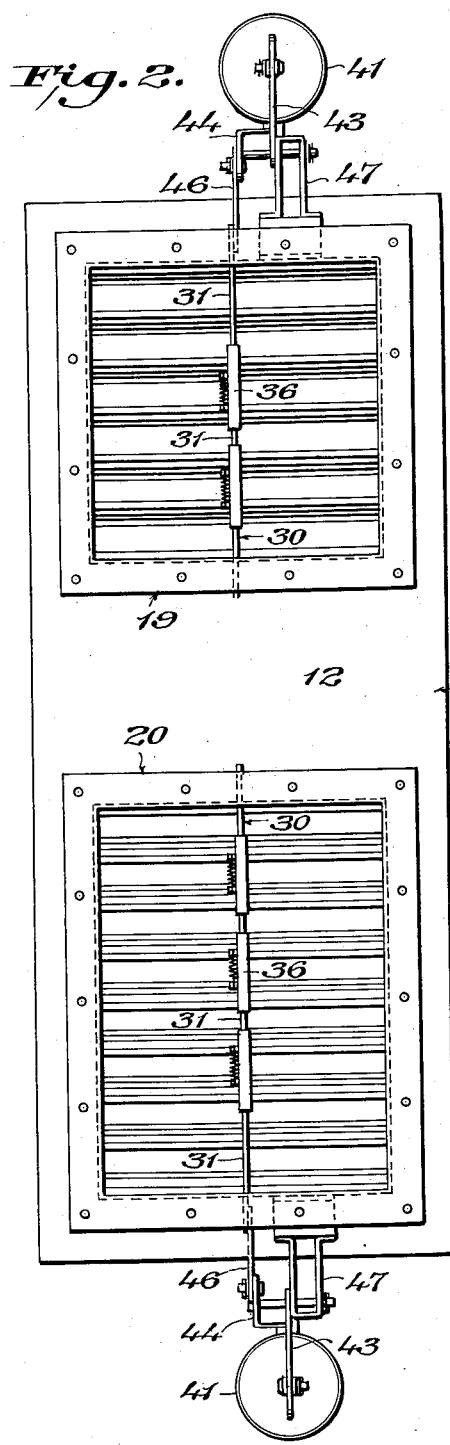
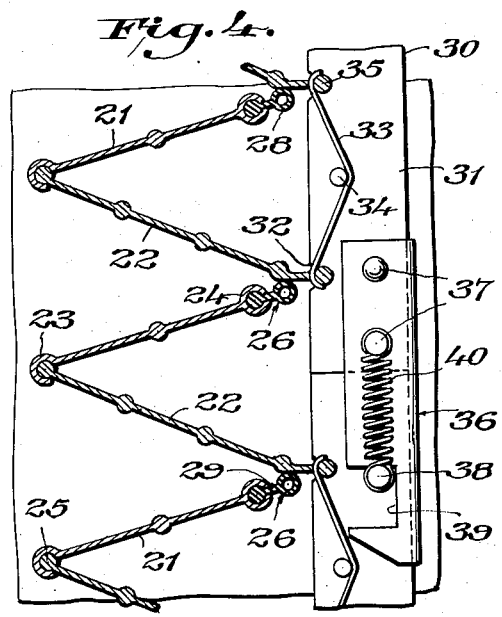
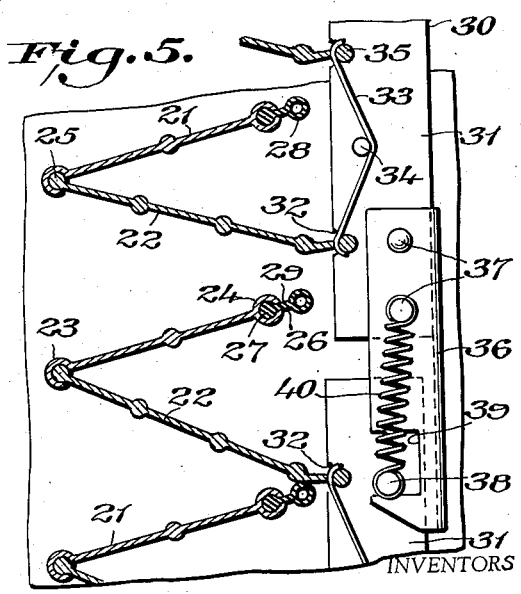
INVENTORS
Franz J. Kurth,
Leonard R. Phillips,
BY Carroll Bailey
ATTORNEY

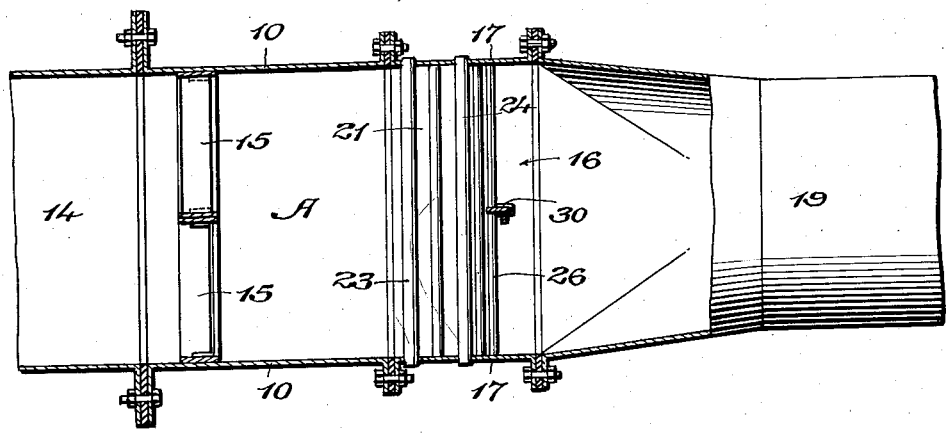
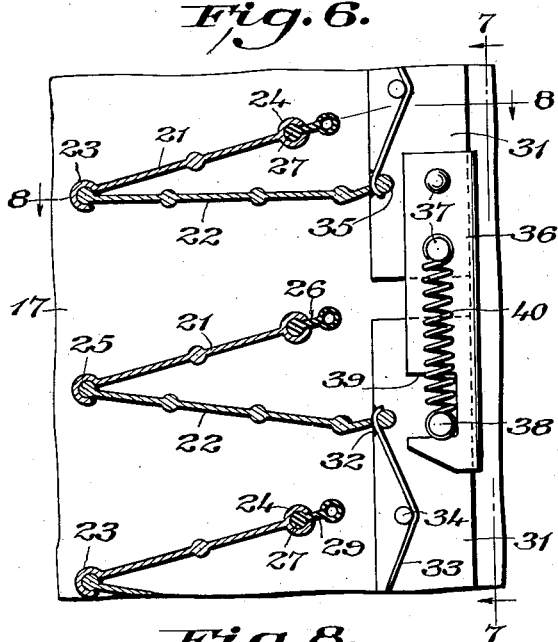
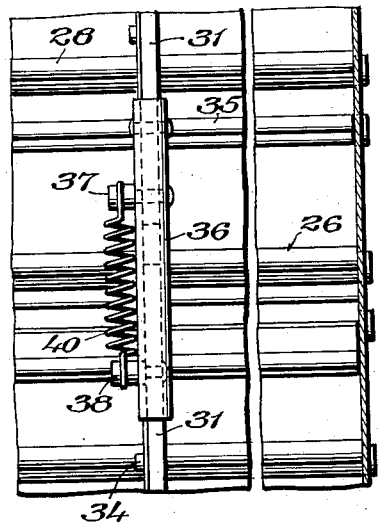
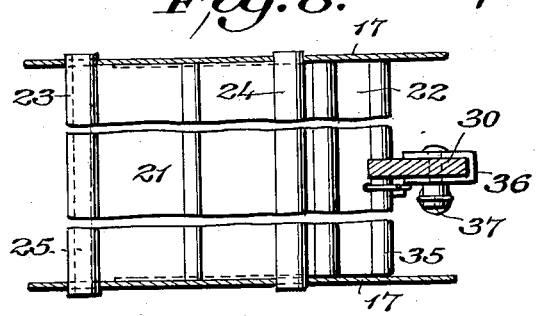
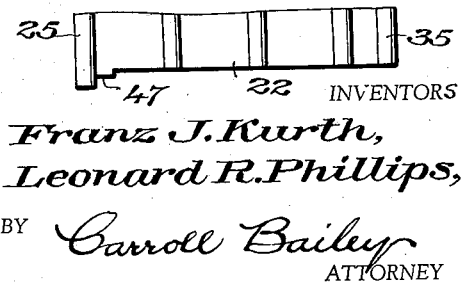

United States Patent Office  2,976,884
Patented Mar. 28, 1961

2,976,884

VALVE STRUCTURES

Franz J. Kurth, Mamaroneck, N.Y., and Leonard R. Phillips, West Hartford, Conn., assignors to Anemostat Corporation of America, New York, N.Y., a corporation of Delaware Filed May 19, 1958, Ser. No. 736,373

6 Claims. (Cl. 137—606)

This invention relates to valve structures, particularly for use in ventilating apparatus to control flow of air through conduits into rooms or other enclosures for heating, cooling or other purposes, although not limited to such use but capable of various other uses, and has special reference to improvements in valve structures of the plural vane type.

One special and important object of the invention is to provide a plural vane valve structure embodying a design such that the pressure of the air or other fluid controlled by the valve structure is utilized to urge the vanes toward closed positions and to maintain the valve structure when closed, tightly sealed against leakage of the controlled fluid therethrough.

Another special and important object of the invention is to provide a vane actuating means which is operable to effect initial opening of one or more of the vanes in advance of the remaining vanes so as to relieve the pressure of the controlled fluid against the vanes and thereby minimize the amount of power required to actuate the vanes, as well as to avoid strain being set up in the actuating means and any sudden opening of the vanes with undesirable quick surge of the controlled fluid such as might occur if all of the vanes were opened simultaneously in accordance with prior art practice.

Another object of the invention is to provide a vane actuating means which is operable in the manner stated and which is of simple, inexpensive, practical construction.

With the foregoing and other objects in view, as will become more fully apparent as the nature of the invention is better understood, the same consists in a valve structure embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Fig. 2 is a rear end view of the air flow control device with the air supply ducts removed to better illustrate the valve structures in rear elevation.

Fig. 3 is a horizontal section through the air flow control device taken approximately on the lines 3—3 of Fig. 1.

Fig. 4 is an enlarged vertical, longitudinal section through a portion of one of the valve structures illustrated in Fig. 1 and showing the vanes in fully closed positions.

Figs. 5 and 6 are views similar to Fig. 4 showing successive stages, respectively, of opening movement of the vanes.

Fig. 7 is a section on the line 7—7 of Fig. 6.

Fig. 8 is a section taken approximately on the line 8—8 of Fig. 6; and

Fig. 9 is an elevation of an end portion of one of the movable vanes of one of the valve structures.

Figure 1:
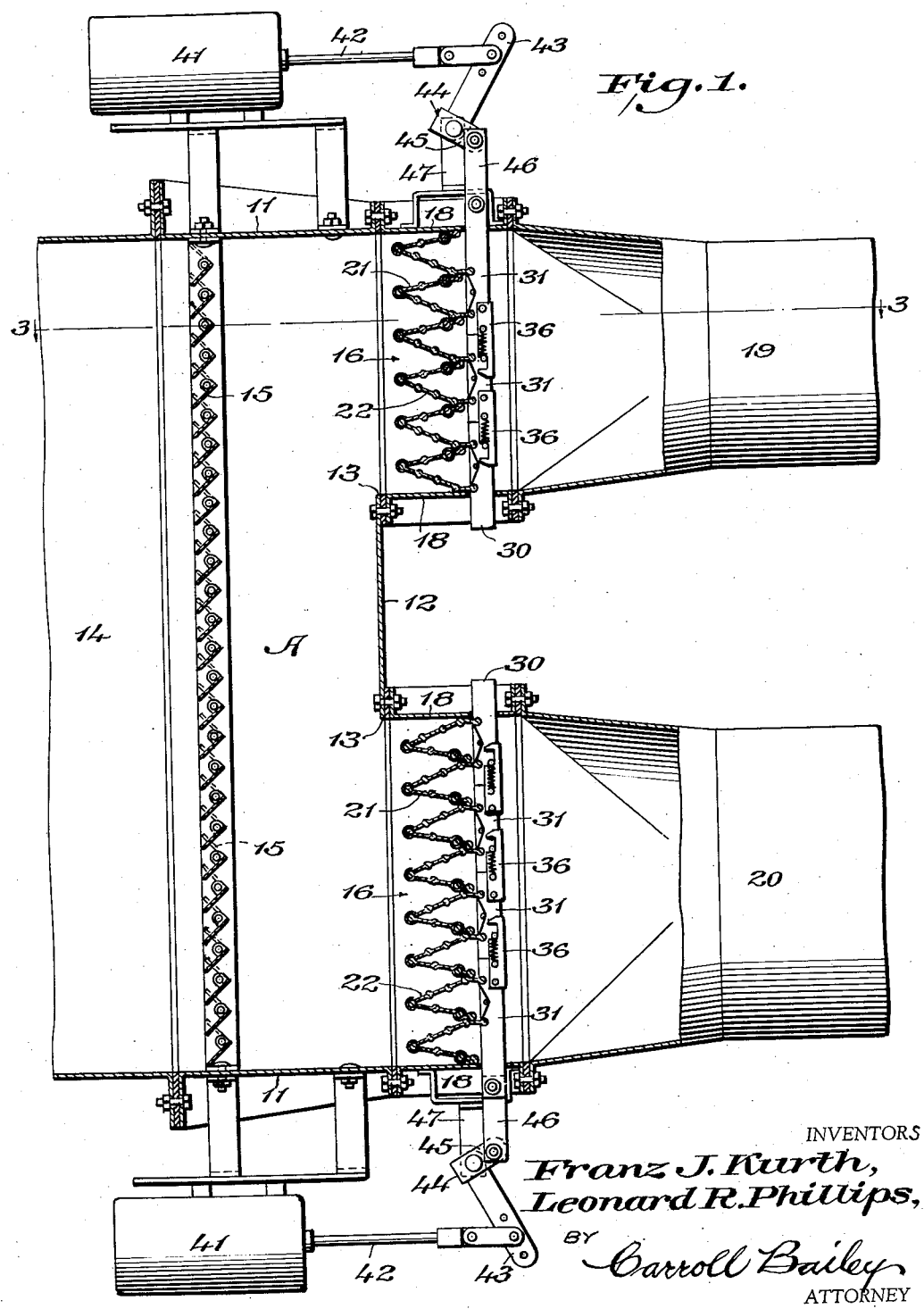
Fig. 1 is a central, vertical, longitudinal section through an air flow control device embodying a pair of valve structures constructed in accordance with the invention.

In order to illustrate one practical use of valve structures formed in accordance with the invention, the drawings show a pair of such valve structures as embodied in an air flow control device to respectively control flow of hot and cold air to said device. It is to be undertsood, however, that this showing is not to be construed as limiting since valve structures formed in accordance with the invention may advantageously be used for various other purposes.

Referring now to the drawings in detail, it will be observed that the air flow control device shown comprises an air mixing and attenuation chamber A of rectangular shape in cross section which is composed of side walls 10, 10, end walls 11, 11 and a rear wall 12 in the end portions of which are openings 13, 13 for flow into said chamber of separate streams of hot and cold air. It will further be observed that the chamber A is open at its front for flow of air therefrom, that a duct 14 is connected to the front of said chamber for conveying air therefrom to a room or rooms or any other enclosure or enclosures for room or enclosure heating or cooling purposes, and that in said chamber are mounted in side to side relationship to each other two sets of vanes 15, 15 which are inclined in reverse directions, respectively, whereby air flowing from opposite side portions of said chamber A into the duct 14 is deflected in reverse directions, respectively, has turbulence imparted thereto and is thoroughly mixed and modulated.

A pair of substantially duplicate valve structures formed in accordance with the invention are employed to control flow of hot and cold air into the chamber A through the openings 13, 13, respectively. Each valve structure includes a casing 16 which is open at its front and rear and which is composed of side walls 17, 17 and end walls 18, 18. The said casings are alined with the openings 13, 13, respectively, and at their fronts are suitably fastened to the rear wall 12 of the chamber A, while at their rears they have suitably fastened thereto hot and cold air supply ducts 19 and 20, respectively.

Since the two valve structures illustrated differ only in size and in all essential respects are duplicates of each other, a detailed description of one will suffice for both. Accordingly, referring to either of said valve structures, it will be noted that in one casing 16 and extending from side to side thereof in spaced apart relationship to each other is a series of fixed vanes 21 which extend forwardly and rearwardly relative to said casing and a companion series of adjustable vanes 22 which are disposed between said fixed vanes, respectively.

Along their front and rear edges the vanes 21 are provided with hollow rib or eye formations 23 and 24, respectively, which at their ends project slightly beyond the ends of said vanes and are engaged in holes in the side walls 17 of the casings 16, whereby said vanes 21 are fixed in said casings. In this connection, while said vanes 21 may be disposed in planes parallel to the longitudinal axis of the casing 16, they preferably are somewhat inclined to said axis, as shown.

Along their front edges the vanes 22 are provided with ribs 25 which are engaged in the hollow rib or eye formations 23 at the front edges of the fixed vanes 21, respectively. Thereby said vanes 22 are paired with and are pivotally connected to the vanes 21 for swinging adjustments relative thereto between closed and open positions.

When the adjustable vanes 22 are fully closed they diverge rearwardly relative to the fixed vanes 21 to which they are pivotally connected and are engaged adjacent to their rear edges with rear edge portions of the next adjacent fixed vanes 21, respectively, as shown in Figs. 1 and 4 of the drawings. In this connection it will be noted that one of the terminal fixed vanes 21 is engaged at its rear edge with the adjacent end wall 18 of the casing 16, that the other terminal fixed vane 21 is spaced from the adjacent end wall 18 of the casing 16 and that the adjustable vane 22 that is pivoted to the last mentioned fixed vane is engaged adjacent to its rear edge with the adjacent end wall 18 of the casing 16 when the adjustable vanes are fully closed. Thereby the fixed and the adjustable vanes in cooperation with the end walls of the casing 16 are effective to completely close the casing against flow of air therethrough when the adjustable vanes are fully closed.

Obviously, to open the adjustable vanes 22 to permit flow of air through the casing 16, said vanes are swung to space their rear edge portions from the rear edge portions of the fixed vanes 21, respectively, full opening of said adjustable vanes being accomplished when the same are disposed substantially parallel to and against the fixed vanes to which they are pivoted.

Carried by the fixed vanes 21 at their rear edges are sealing strips 26 of rubber, plastic or other suitable flexible material with which the rear edge portions of the adjustable vanes 21 are engaged when they are fully closed and which are urged against the rear edge portions of said adjustable vanes by the pressure of the controlled air to form tight seals between the rear edge portions of the fixed and the adjustable vanes. Along one edge of each strip is a rib 27 which is disposed in the hollow rib or eye formation 24 of the related vane 21 to assemble the strip with the vane, while along the other edge of each strip 26 is a rib 28 for sealing contact with the related adjustable vane 22. Preferably, though not necessarily, the ribs 28 are hollow to enhance their softness and tight sealing contact with the adjustable vanes 22. Between their ribs 27 and 28 the sealing strips 26 are composed of relatively thin webs 29 so that they are readily flexible laterally by the pressure of the controlled air to accomplish their sealing purpose.

Since the adjustable vanes 22 are pivoted at their front edges, it is apparent that the pressure of the air which they control urges them toward closed positions and insures their tight sealing cooperation with the fixed vanes 21 when they are closed. This means, of course, that the pressure of the air or other controlled fluid acting against said vanes must be overcome before they can be opened and that the greater the number of said vanes in any given valve structure the greater would be the force required to effect their initial opening if their actuating means were operable to open them simultaneously in accordance with prior art teachings. In this connection not only would an extraordinary amount of force be required to effect initial opening of the vanes simultaneously, but, before the vanes would open, considerable strain would be set up in their actuating means which would result in their sudden opening with a consequent quick, undesirable surge of the controlled fluid and accompanying undesirable noise.

In accordance with the present invention a novel actuating means for the adjustable vanes 22 is provided whereby one or more of said vanes may initially be opened in advance of the other of said vanes and whereby, if need be, said vanes may be opened successively either singly or in groups of two or more, thus either initially or gradually to relieve the pressure of the controlled air against them so as to permit them to be opened and adjusted by only small effort and without the various disadvantages, such as those mentioned, which would be inherent to opening them simultaneously in accordance with prior art teachings.

The present actuating means comprises a bar, designated generally as 30, which is composed of a plurality of sections 31 disposed in end to end relationship to each other and which may include either a separate section for each of the adjustable vanes 22 or a separate section for each group of two or more of said vanes. In the present instance there is a separate bar section 31 for each group of two of the vanes 22.

The bar 30 is disposed rearwardly of and extends transversely relative to the vanes 22 and its sections 31 are suitably connected to the rear portions of said vanes so that by longitudinal movement of said bar in one direction opening swinging movements are imparted to said vanes while by longitudinal movement of said bar in the opposite direction closing swinging movements are imparted to said vanes.

While the bar sections 31 may be connected to the vanes 22 in any suitable manner, one simple, practical manner of connecting said sections to said vanes may reside in providing in the bar sections slots 32 which open through the front edges of said sections and which have the rear edge portions of the vanes 22 disposed therein, spring clips 33 being engaged medially with pins 34 carried by the bar sections 31 and being engaged at their ends in holes in the rear edge portions of adjacent pairs of the vanes 22 to maintain the bar in assembly with said vanes against any looseness with respect thereto. Appropriately, the inner end portions of the slots 32 may be of substantially circular shape and the rear edge portions of the vanes 22 may be formed with ribs 35 to fit neatly in the inner end portions of said slots to provide suitable pivotal connections between the vanes and the bar sections.

Between each two adjacent sections 31 of the bar 30 is a suitable lost motion connection to permit a limited amount of longitudinal separation of said sections. Also between each two adjacent sections 31 of the bar 30 is a suitable yieldable means which tends constantly to longitudinally contract said sections.

While suitable lost motion connections may be provided between adjacent sections 31 of the bar 30 in various different ways, one such connection is illustrated by way of example in the drawings as comprising a member 36 of U-shape in cross section engaged over the rear adjacent end portions of the bar sections 31, 31 and serving to hold the sections in alinement with each other. One end portion of said member 36 is suitably fastened to one of said bar sections as by means of rivets 37. On the other hand, the other bar section is longitudinally slidable in the other end portion of said member 36 and is provided with a pin 38 which is disposed in a slot 39 of limited length in one of the side walls of the last mentioned end portion of said member 36. Thus the two bar sections are connected together for a limited amount of endwise movement relative to each other.

The yieldable means tending constantly to contract the bar sections 31 may appropriately comprise a helical tension spring 40 connected at one end to the pin 38 and at its other end to one of the rivets 37.

When the vanes 22 are closed, the bar sections 31 are held contracted relative to each other by the springs 40 and the vanes may be opened by exerting a pulling force upon one of the terminal bar sections 31.

Upon exertion of a pulling force upon the said terminal section 31 of the bar 30, such force obviously will initially be transmitted positively only to the vane or vanes 22 that is or are connected to said terminal bar section. Therefore, only the vane or vanes that is or are connected to said terminal bar section may be opened initially. Opening of such vane or vanes may sufficiently relieve the pressure of the air against the other vanes to permit the latter to open without increase in the pulling force exerted upon the terminal bar section 31 and without distension of the bar sections 31. If, however, the pressure of the air against the other vanes 22 is sufficient to maintain them closed despite relief of such pressure by initial positive opening of the vane or vanes that is or are connected to the terminal bar section 31, exertion of increased pulling force upon the terminal bar section will result in separation of said section from the next adjacent or second bar section and tensioning of the spring 40 between said sections, as shown in Fig. 5, until the next adjacent or second bar section is moved to open its related vane or vanes either by the increase in the tension of the spring 40 or positively by reason of completion of the permissible amount of lost motion movement of the terminal bar section relative to the next adjacent section.

Opening of the vane or vanes 22 that is or are connected to the second bar section 31 may sufficiently relieve the pressure of the air against the other vanes to permit the latter to open without further increase in the pulling force exerted upon the terminal bar section 31. If not, increase in the pulling force exerted upon the terminal bar section will result in the same action between the second and the third bar sections 31 as between the terminal and the second bar sections until the third bar section is moved to open its related vane or vanes 22 (see Fig. 6).

Finally, due to successive opening of a sufficient number of the vanes 22, either singly or in groups of two or more, closing pressure of the controlled air against the vanes will vanish or will become so reduced as to offer little or no resistance to collective adjustment of all of the vanes to regulate flow of air through the valve structure. Thereupon, the springs 40 will contract the bar sections 31 relative to each other and they will remain contracted during collective adjustments of the vanes and until such time as the vanes are closed, whereupon the recounted operation will be repeated whenever it is necessary to again open the vanes.

Since successive opening of the vanes 22 results in progressive decrease in air pressure against them, it is apparent that their successive opening either singly or in groups of two or more and their subsequent collective adjustments requires comparatively little power as compared with the power that would be required to effect initial opening of all of them simultaneously. Moreover, when a power mechanism is employed to actuate said vanes, successive opening of the vanes in accordance with the invention avoids build-up of undesirable strain in the power mechanism as well as sudden, simultaneous opening of the vanes and consequently avoids undesirable surge of the air and accompanying undesirable noise.

Any suitable power mechanism may be provided to actuate the vanes 22. In this connection and as illustrated by way of example in the drawings, a cylinder and piston power unit operated by air or other fluid is provided to actuate said vanes and is designated generally as 41. This power unit may be mounted in any suitable manner adjacent to the casing 16 and has its piston rod 42 connected to one arm 43 of a bell-crank lever 44 which likewise may be mounted in any suitable manner adjacent to the casing 16. The other arm 45 of said bell-crank lever is connected by a link 46 to the terminal section 31 of the bar 30 that is pulled to open the vanes. Thus said power unit 41 is connected to the bar 30 for actuating the same in the manner previously described to initially open certain of the vanes 22 in advance of other of said vanes and subsequently to adjust all of said vanes collectively.

According to the particular embodiment of the invention illustrated in the drawings, the power units 41 are mounted on the casing A and the bell-crank levers 44 are mounted on brackets 47 carried by the valve casings 16, 16, respectively. In this connection it will be understood that operation of the power units 41 is under the control of suitable thermostatic means whereby said power units are caused to open or close the respective valve structures to properly regulate the delivery of hot and cold air from the supply ducts 19 and 20 to the duct 14 to satisfy the temperature requirements of whatever space or spaces is or are supplied with air by the duct 14.

As illustrated in Fig. 9 of the drawings, the adjustable vanes 22 may be provided at their ends, adjacent to their front edges, with slight projections 47 to engage the side walls 17 of the casing 16 and thus slightly space the major portions of the ends of said vanes from said walls 17, thereby to avoid scraping of said walls by the ends of said vanes and to render said vanes freely swingable.

From the foregoing description considered in connection with the accompanying drawings it is believed that the construction and mode of operation of valve structures formed in accordance with the invention will be clearly understood and that their advantages will be appreciated. It is desired to point out, however, that while only a single, specific structural embodiment of the invention has been illustrated and described, the same is readily capable of various other specifically different embodiments within its spirit and scope as defined in the appended claims.

We said:

1. In a valve structure, a plurality of pivoted vanes, a bar extending transversely relative to said vanes and having therein and opening through an edge thereof slots in which free edge portions of said vanes are disposed whereby said bar is connected to said vanes for swinging them by longitudinal movement of said bar, and spring clips having their medial portions secured to said bar and their ends secured to the free edge portions of said vanes so as to retain said free edge portions in said slots when said vanes are in either open or closed position.

2. In a valve structure, a plurality of pivoted vanes, a bar extending transversely relative to said vanes and having therein and opening through an edge thereof slots in which free edge portions of said vanes are disposed whereby said bar is connected to said vanes for swinging them by longitudinal movement of said bar, pins carried by said bar between adjacent edges of said vanes, and a spring clip medially engaged with each pin and having its end portions engaged with the vanes to either side of the pin to hold the free edge portions of said vanes in said slots.

3. A valve structure comprising a casing including side walls having holes therein, a plurality of spaced apart vanes in said casing extending forwardly and rearwardly relative thereto and having eye formations at their front and rear extending beyond the ends of said vanes and engaged in the holes in the side walls of said casing to fix said vanes in said casing, another plurality of vanes in said casing between said fixed vanes and each having a rib at its forward end disposed in the eye formation at the front end of a related fixed vane to mount the second plurality of vanes for swinging movements to open and close the spaces between said fixed vanes, and means connected to said second plurality of vanes for swingably adjusting them, said means comprising, a bar extending transversely relative to said vanes and having therein and opening through an edge thereof slots in which free edge portions of said vanes are disposed whereby said bar is connected to said vanes for swinging them by longitudinal movement of said bar, spring clips between said bar and said vanes holding the free edge portions of said vanes in said slots.

4. A valve structure as set forth in claim 3 including sealing strips of flexible material at the rear edges of the fixed vanes engaged by rear edge portions of the adjustable vanes, respectively, when the latter vanes are in positions closing the spaces between said fixed vanes, each sealing strip including a pair of ribs and a web connecting them, one rib of each strip being disposed in the eye formation at the rear edge of the related fixed vane to connect the strip to the vane, the web and the other rib of each strip being disposed rearwardly of the rear edge of the related fixed vane to adapt the strips for lateral flexure into tight sealing engagement with the rear portions of the swingable vanes.

5. In a ventilating duct system including a mixing chamber and air supply ducts communicating with said mixing chamber, valve means for regulating the flow of air from said air supply ducts into the mixing chamber, said valve means comprising, a rectangular casing having side and end walls, and a plurality of substantially V-shaped vane elements supported on axes transversely of said side walls, one of said vane elements being fixed and the other movable relative thereto, the said movable vane held closed relative to the fixed vane by existant air pressure, means for controlling the gradual opening of said vanes by progressive movement of successive adjacent movable vanes, said means having a sectional bar, a lost motion connection for said bar including a spring having one end connected to one of said sections and normally biasing all sections together when the movable vanes are closed, and means for moving the sections of said bar progressively to successively move the movable vanes to open position.

6. A ventilating duct system comprising, in combination, a mixing chamber, air supply ducts communicating with said mixing chamber, and means for regulating the flow of air from said ducts, said means comprising, a casing open at its front and rear and having oppositely disposed side and end walls, a plurality of fixed vanes extending laterally of said casing and secured to the side walls thereof, a plurality of adjustable vanes disposed between said fixed vanes and pivotally secured at their front edges to the front edges of said fixed vanes, the rear edges of said adjustable vanes engaging the rear edges of the next adjacent fixed vanes when said adjustable vanes are in closed position, flexible sealing means carried by said fixed vanes at their rear edges, actuating means for successively opening said adjustable vanes, said means comprising a bar including a plurality of sections, means connecting one of the said sections to a source of power, said bar disposed rearwardly of and extending transversely relative to said adjustable vanes, said sections connected to the rear edges of said adjustable vanes and also connected to each other, lost motion means connecting said sections to each other, said means comprising a link member secured at one end to one of said sections and having a slot in its other end, a pin secured to the next adjacent bar section and disposed within said slot, yieldable means attached at one end to said pin and at its other end to said link member, said yieldable means tending constantly to contract said bar sections, whereby, upon exertion of force through said source of power to the bar section connected therewith, only the adjustable vanes secured to said bar section will be initially opened, thus relieving air pressure against the other vanes to permit gradual progressive opening thereof with a minimum of force thereby controlling the flow of air from the ducts to the mixing chamber.

References Cited in the file of this patent

UNITED STATES PATENTS

| | | |
|---|---|---|
| 131,738 | Carpenter | Oct. 1, 1872 |
| 1,132,570 | Fivey | Mar. 23, 1915 |
| 1,494,224 | Dyrssen | May 13, 1924 |
| 2,207,147 | Gilbertson | July 9, 1940 |
| 2,266,009 | Danielson | Dec. 16, 1941 |
| 2,293,065 | Kiczales | Aug. 18, 1942 |
| 2,503,764 | Ott | Apr. 11, 1950 |
| 2,679,263 | Kiser | May 25, 1954 |
| 2,693,825 | Carr | Nov. 9, 1954 |
| 2,718,840 | Lyman | Sept. 27, 1955 |
| 2,796,082 | Green | June 18, 1957 |